Dec. 17, 1940.　　　C. H. NORDELL　　　2,225,437
SEWAGE DISPOSAL
Filed Sept. 23, 1935　　　2 Sheets-Sheet 1
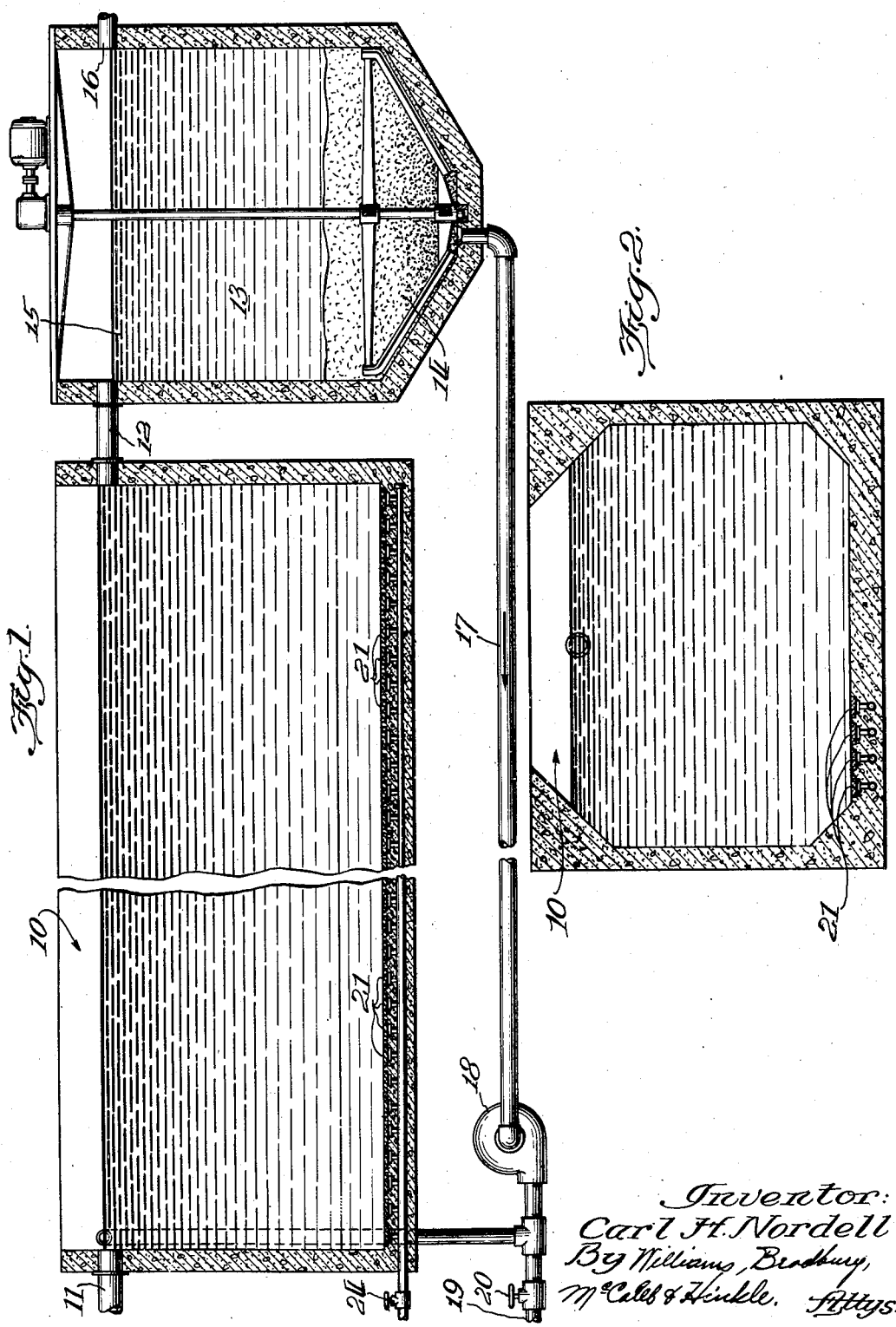

Dec. 17, 1940.   C. H. NORDELL   2,225,437
SEWAGE DISPOSAL
Filed Sept. 23, 1935   2 Sheets-Sheet 2
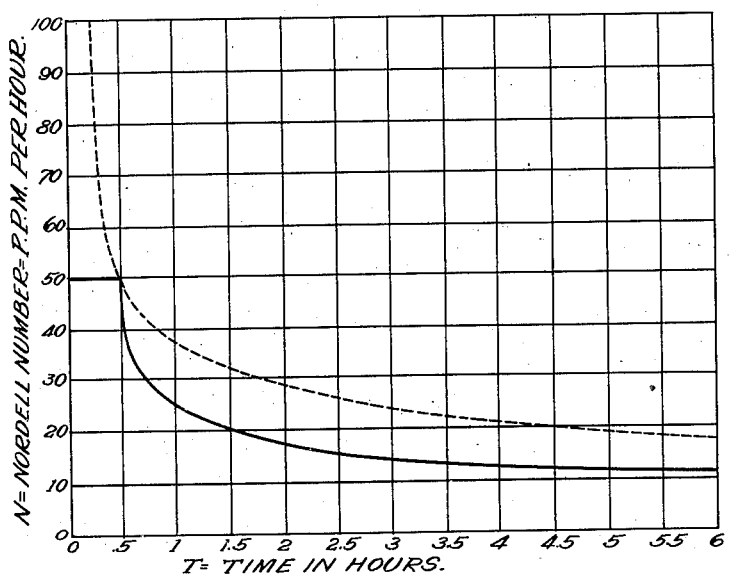
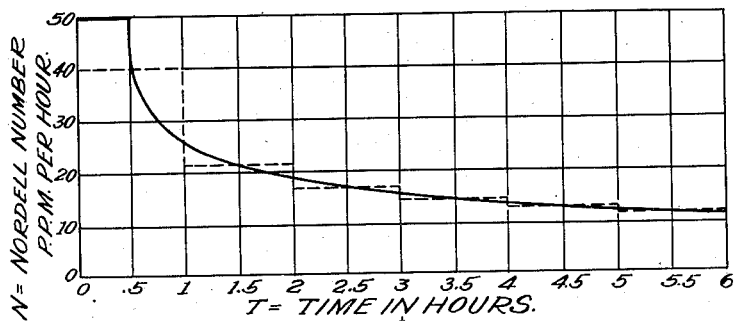
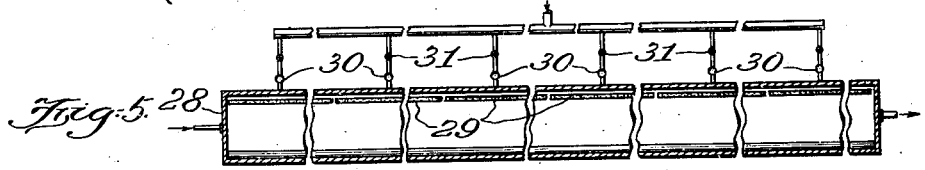
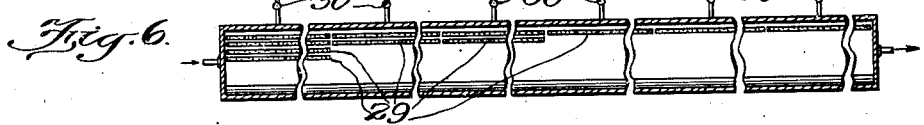
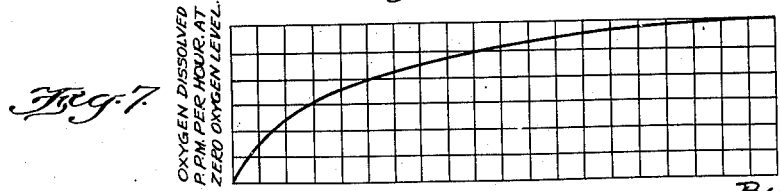
Inventor:
Carl H. Nordell
By Williams,
Bradbury, McCaleb
& Hinkle, Attys.

Patented Dec. 17, 1940

2,225,437

UNITED STATES PATENT OFFICE 2,225,437

SEWAGE DISPOSAL

Carl H. Nordell, Chicago, Ill., assignor to Advance Engineering Company, Chicago, Ill., a corporation of Illinois Application September 23, 1935, Serial No. 41,751

2 Claims. (Cl. 210—8)

This invention relates to sewage disposal and particularly to that type of sewage disposal which is commonly called the activated sludge process.

The activated sludge process is one of oxidation and coagulation and is characterized by the admixture with the incoming sewage of the sludge or precipitate which settles from the sewage in the final steps of the process and which is commonly called activated sludge. This returned activated sludge has a bacterial or catalytic effect with the result that the sewage admixed therewith is rapidly oxidized and the suspended solid impurities coagulated, invariably by air supplied to the treatment tanks. After the oxidization process, the mixed liquid is fed into sedimentation tanks. The sludge or precipitate settles out rapidly and completely, leaving a harmless effluent which may be discharged into lakes and streams without evil results.

Activated sludge disposal plants have, heretofore, been installed and operated under empirical guidance, with the result that many of them are inefficient and wasteful. In many cases, excessively large or numerous aerating tanks have been installed for the amount of sewage to be treated. In other cases the tanks provided have been insufficient. Particularly has this situation arisen when empirical knowledge gained with weak sewage has been applied to the treatment of strong industrial wastes. In still other cases, the air supplied to the aeration tanks is greatly in excess of that needed for satisfactory treatment of the sewage. Since the expense of pumping air is one of the major items in the cost of running an activated sludge plant, lack of control in this direction is very objectionable. Heretofore, when attempts have been made to reduce air consumption, troubles have ensued since the quality of sewage to be treated varies from day to day and, indeed, from hour to hour, and curtailment of air supply, unless under accurate scientific control, invariably leads to undertreated sewage and more or less impure effluent.

Heretofore aeration tanks have invariably been built to provide uniform aeration along the whole length of the tank. I have discovered that it is impossible efficiently to treat sewage in such a tank. I have found that in the presence of sufficient oxygen a greater amount of oxidation occurs in the incoming end of the tank and that the oxidation progressively decreases toward the outgoing end of the tank. Uniform oxidation, in the manner heretofore practiced, necessarily results in insufficient oxygenation at the incoming end of the tank, or excessive and useless supply of excess oxygen during the major length of the tank, and in many cases both.

Another important factor of the activated sludge process which has heretofore received scant consideration, is the effect on the oxygenation process, as a whole, exercised by the relative proportion of sludge which is returned or recirculated. I have found that for satisfactory and efficient operation, the amount of sludge returned should be carefully and accurately controlled according to its oxidizing power, and hereinafter I will discuss this control in detail.

A very important factor of the sewage treatment process resides in the quality of the sewage which I will term throughout the "strength of sewage." It is well known that the nature of sewage varies from day to day and also from hour to hour. Heretofore, the strength of sewage has been connected with the total oxygen demand of the sewage. This is conventionally determined by the so-called five-day B. O. D. test. The abbreviated title corresponds to "biological oxygen demand." As its name indicates, this test requires five days for completion and since sewage is normally completely treated in a period of the order of five to eight hours, the values derived from this test afford little other than historical interest. I have devised methods of, and apparatus for, testing the strength of sewage, which enable the strength of sewage to be determined very rapidly and I am able to employ the results of these tests for the purpose of controlling the purification of the sewage on which the test was made.

It is important from an economical standpoint that each particle of sewage entering the treatment tank pass through the tank at the same rate as each other particle, so that no part of the liquid entering the chamber at one end will receive less treatment than any other particle, the result being that the whole of the liquid will be thoroughly treated in less time than if the treatment had to be continued long enough throughly to treat that part of the liquid passing through the tank most rapidly. This condition can be attained practically in different ways. Thus, I may use tanks which are very long in comparison to their depth and width. By filling the corners so as to make them rounded or to avoid spaces where eddy currents may be created, the spiral flow of the liquid through the tank may be maintained in orderly fashion with a minimum of back and forward movement of the liquid in the longitudinal direction of the tank. By way of practical illustration I may employ a treatment tank which is 15 feet wide, 12 feet deep and has a length of the order of 500 feet. By such a tank short-circuiting is substantially prevented. Short-circuiting may also be prevented by employing a plurality of small tanks connected in series by openings of such size that the flow is always in one direction, that is, from the inlet end to the outlet end of the series of tanks.

The invention will be readily understood from the following description thereof, taken in conjunction with the accompanying drawings, in which:

Figure 1 is a longitudinal sectional view of an aeration tank and a settling tank embodying my invention;

Fig. 2 is a sectional elevation of the aeration tank;

Fig. 3 is a graph showing the manner in which the rate of oxidation of typical mixed liquids varies with respect to time;

Fig. 4 is a graph showing a typical natural oxidation rate curve and a stepped curve approximating the natural curve in a practical manner;

Fig. 5 is a plan view of an aeration tank adapted to the practice of my improved process;

Fig. 6 is a similar view of a tank modified to give greater efficiency of aeration, and Fig. 7 is a typical graph illustrating the efficiency of a diffuser plate.

Referring to the drawings, and particularly to Fig. 1, the reference numeral 10 indicates diagrammatically a typical aeration tank. These tanks are of considerable length in comparison to their breadth and depth. The incoming sewage is supplied at one end by the pipe 11. After aeration, the mixed liquid passes by pipe 12 to a sedimentation tank 13 in which a layer of sludge 14 settles from the clear effluent 15. The clear effluent 15 escapes by pipe 16 from which it passes to streams, lakes, or elsewhere. The precipitate or sludge is withdrawn from the bottom of the sedimentation tank 13 through the pipe 17, and it is conveyed by a pump 18 to the incoming end of the tank 10. A portion of the sludge is bled from the pipe 17 by means of the pipe 19, the amount thus bled or withdrawn from the system being controlled by the valve 20 in this pipe.

The tank is equipped with means for supplying air thereto, which I have diagrammatically shown as the diffusers 21. Air is supplied to these diffusers which has the effect of both supplying oxygen to the mixed liquid and also of maintaining the mixed liquid in a state of agitation, thereby preventing settlement of solids in the tank 10. In Fig. 2 I have shown several air supplying diffusers 21, the purpose of which will hereinafter be discussed in detail. Means are provided for controlling the amount of air supplied to the diffusers 21, which may suitably be valves (not shown) controlling the air supply to each diffuser 21.

It is important to be able to determine accurately and quickly the rate of oxidation occurring in the mixed liquid in the tank which may conveniently be done by the testing apparatus described and claimed in my copending application Serial No. 41,750 (Case 7) filed of equal date herewith. The rate of utilization of oxygen expressed in parts per weight per million parts of liquid I call the Nordell number of the mixed liquid at that particular time. The Nordell number may be determined in other ways, if desired. From suitable determinations of the Nordell number I am enabled to determine the maximum rate of oxygen utilization along the tank and am enabled to regulate the oxygen supply in close conformity to the demand, thereby attaining considerable economies in addition to purifying the sewage more effectively.

I have done considerable work with a view to determining the various factors which affect utilization of oxygen by the mixed liquid. I have made the fundamental observation that the rate of oxygen utilization is independent of the concentration of the oxygen in the mixed liquid. In other words, as far as the utilization of oxygen is concerned, it matters not whether the mixed liquid is fully saturated with oxygen or whether only a relatively small amount of oxygen is dissolved in the mixed liquid.

I have made the further observation that for any particular mixed liquid, the rate of oxygen utilization remains substantially uniform for a definite period after the sewage and sludge are mixed together. At the end of this period the rate of oxygen utilization decreases in a manner which will hereinafter be discussed with reference to the curves shown in the drawings. I have found that this initial uniform rate depends directly upon the amount of sludge in the mixed liquid. In other words, if the mixed liquid of one experiment contains double the amount of sludge than does the mixed liquid of another experiment, the sewage and sludge being the same in both cases, then the first mixed liquid will utilize oxygen at double the rate of the second mixed liquid.

Another fact I have observed is that the persistence of the initial uniform rate of oxygen utilization depends directly upon the amount of the sewage in the mixed liquid, assuming that the concentraton of sludge in the mixture is the same in both cases. The same factor may be stated in another way with reference to strength of sewage; that is, this persistence of maximum uniform rate of oxygen utilization depends upon the amount of oxidizable material in the sewage and varies directly with the concentration of such oxidizable material. As a result of very considerable experimentation I have evolved a simple formula and graphs which explain the behavior of any typical mixed liquid. Thus, referring to Fig. 3, and more particularly to the curve thereon in full lines, it will be noted that the initial Nordell number or the maximum rate of oxygen utilization possible per million parts by weight of mixed liquid per hour for the particular mixed liquid so considered is 50. This is the maximum rate, and it persists for a period of one-half hour. At the end of the half hour, the rate decreases quite rapidly, but the decrease slows up gradually and at the end of six hours the curve has attained a slight downward deviation from the horizontal.

It is also to be noted that the rate at the end of six hours is decreased to the order of one-fourth or one-fifth of the original rate. For the purpose of convenience, I designate the maximum rate, that is, the maximum Nordell number for any particular mixed liquid, by the symbol M. I have found that the portion of the curve after the Nordell number has begun to decrease is very closely given by the formula $$N = \frac{M}{\sqrt{\frac{MT}{K} - 1} + 1}$$

where T is time measured in hours after the mixing of the sludge and sewage, K is a constant for the particular sewage and is substantially proportionate to the amount of oxidizable material in the sewage. I arbitrarily designate K as the strength of sewage.

Now referring to the determinations which I have referred to above, it will be noted that the first determination, that is, one made promptly on a sample taken from the tank after the mixing of the sludge and the sewage or a sample of known sludge content, gives me M, or the maximum Nordell number for the particular mixed liquid. A second determination made on the sample after a definite period of aeration and agitation in the testing chamber, provided it gives a substantially lower rate of oxygen utilization, corresponds to a point on the curve subsequent to the period of persistence of M. Since the time of treatment between the two positions can be readily determined from the tank dimensions and the rate of supply of liquid to the tank, it will readily be understood that mere calculation will give a numerical value for the symbol K according to the formula $$K = \frac{MTN^2}{(M+N)^2 + N^2}$$

It is very important that the values of M and K for the particular sludge and sewage under treatment in the plant should be determined very quickly. I may accelerate the test by the expedient of using a much greater quantity of sludge in the sample tested than prevails in the aerating tanks of the plant. This has the effect of increasing the M. Owing to the relatively small amount of sewage in the mixture in the sample, this maximum value M persists for a much shorter time. This procedure is exemplified by the dotted line curve in Fig. 3 in which the value of M of 100 is obtained instead of a value of 50 which is shown in the full line curve. It may be assumed that the dotted line curve represents the test, and the full line curve represents the operation in the aerating tanks of the plant. It will be understood, however, that in the case of weak sewage and very active sludge, I may make the test with a smaller proportion of sludge than prevails in the treatment tank in order to get a sufficiently long period of persistence of M in order that that quantity may be accurately measured.

It is to be understood that where the test has been accelerated by varying the quantity of the sludge from that employed in the tank, the value of M in the tank may be derived from the observed value in view of the fact that M is directly proportional to the amount of the sludge in the mixed liquid.

The final result of these tests is to provide me with a numerical value K for the strength of the sewage. If desired, I may make a test of the rate of oxygen utilization at the outlet end of the tank. This value I refer to as FN meaning the final Nordell number. Of course, the Nordell number varies between the values M and FN along the length of the aeration tank.

I find in practice that I can obtain very accurate values for FN by calculation from the equation $$FN = \frac{M}{\sqrt{\frac{Mt}{K} - 1} + 1}$$

using the values of M and K determined above. The time $t$ is the time of treatment in hours and is calculated from the volume of the tank and the rate of supply of liquid thereto.

In the case of some sludges, particularly those which are out of condition due to excessive storage under anerobic conditions or with insufficient air or other obscure causes, I find that somewhat erratic readings may be obtained for the quantity M and in some cases for the quantity N. I have found that these difficulties may be substantially avoided by pretreating the sludge for some time, for example for an hour or two, with air. The pretreated sludge is then used in the tests and the operating conditions indicated by the results of these tests will bring the sludge back to normal operating condition in the continuous cycle of the plant.

In calibrating the treatment tank I regard it as divided into a definite number of separate portions, for example six, each supplied by one aerator unit. The aerator unit should be calibrated and, if necessary, and this is usually the case with existing plants, the aerator capacity should be augmented by adding further diffuser units 29, as shown in Fig. 6. To calibrate the aerating unit or units for one part of a tank, I proceed as follows:

I fill the tank with mixed liquid and proceed with the aeration without admitting or venting mixed liquid. I preferably divide the tank into sections by means of temporary partitions so as to prevent results being modified owing to convection currents from one section to another. I determine N, the rate of utilization of oxygen in parts by weight per million per hour from time to time, and simultaneously, I determine the oxygen level L and also the saturation point S of the mixed liquid. The quantity S is the amount of oxygen expressed in parts by weight per million parts of mixed liquid. This quantity may suitably be determined by taking a sample of mixed liquid, allowing the sludge to settle and withdrawing the clear supernatant. The supernatant is then subjected to intense aeration until it is saturated. The oxygen content is then determined by well-known methods. I also note the amount of air supplied to each section of the tank by meters 30 as shown in Figs. 5 and 6. This supply of air is controllable by means of valves 31. Thus I know the amount of air supplied in cubic feet per hour R. I know the amount of oxygen utilized in pounds per hour, and I know the level of oxygen and the saturation level S. The level of oxygen is an important factor. It can readily be understood that greater efficiency of absorption or solution of oxygen is obtained when the oxygen level is low. In any practical diffuser system, the rate of oxygen absorption is substantially directly proportional to the oxygen deficiency from the saturation level S.

I make several observations along these lines after aeration for several hours, so that the rates of oxygen utilization are in a substantially static condition. Thus I find that with a certain N, and rate of air supply R, I get an oxygen level L. The oxygen deficiency is S minus L. To calculate for zero oxygen level I multiply the N by S and divide by S minus L and find the rate of oxygen which would be dissolved with supply of an R if the oxygen level had been at zero. This figure, like N, is expressed in parts per weight per million per hour. A few points thus derived by varying R give for any particular section of the tank a curve of the general nature shown in Fig. 7. In operation I prefer to maintain the tank at approximately zero oxygen level for reasons of high efficiency of aeration. I can simplify matters very much by merely calibrating the valves 31 so as to express the air supply in terms of this rate at zero level. Thus, instead of calibrating the valves 31 in cubic feet of air per minute, I calibrate them so as to indicate the rate of dissolution of oxygen in parts per million per hour at zero oxygen level. It will be understood that it is possible to maintain a zero oxygen level because the sludge is utilizing oxygen at this level at exactly the same rate at which it is being dissolved in the mixed liquid. In calibrating the valves 31 I prefer to provide a somewhat larger flow of air than that indicated in order to make sure that adequate aeration is provided at all times.

Now to return to a typical process with the stepped curve which we have shown in Fig. 4, at our disposal, we can see at a glance the amount of oxygen that each section should have. Thus considering the first section, we see from inspection of the curve given in Fig. 4 that this section should be supplied with oxygen at a rate of so many parts by weight per million per hour. From the curve given in Fig. 7, I can read directly that air should be supplied at a corresponding rate of cubic feet per minute in order to obtain this result. I can set the valve 31 accordingly to give this reading on the meter 30, or as indicated above, I may merely set the valve to the proper mark given by the calibration of the valve which I have briefly discussed above. The same procedure is followed with each of the other sections, utilizing the appropriate curve appertaining to each section which is of the general nature shown in Fig. 7.

From a consideration of the curve of Fig. 7, it will be seen that the efficiency of dissolution for any particular diffuser unit diminishes rapidly with a heavy volume of air fed through it. Efficiency is regained by the expedient of placing additional diffuser elements in the tank section which are ordinarily more necessary in sections which treat the incoming sludge, as shown in Fig. 6. The arrangement of diffusers shown in Fig. 2 enables high efficiency of dissolution of oxygen to be attained. At the same time the diffusers 21, insure the much greater supply of oxygen at the incoming end of the aeration tank.

While I have indicated that I prefer to operate at zero oxygen level, I may operate at slightly higher oxygen levels but such procedure is decidedly wasteful since oxygen dissolution is less efficient at higher oxygen levels.

In the efficient operation of an activated sludge plant, one of the principal aims is to produce a highly purified effluent which can be discharged into lakes and streams without objectionable results, such as bacterial contamination, decomposition with the production of odors, depletion of the oxygen content and so forth. At the same time this aim should be obtained with the lowest cost possible, and as I have indicated above, one of the principal items of cost is the pumping of air.

With reference to Fig. 3, it will be noted from the full-line curve that the ratio of M to FN is approximately four to one. This is a very important control ratio. A plant should be operated so as to keep this ratio as small as possible without running into trouble from insufficiently treated sewage. The nature of sewage depends so much upon local conditions, and is varied from place to place by so many factors, for example, the nature of the trade wastes in the locality, that a definite figure for this ratio cannot be given. Activated sludge plants have been able to run indefinitely with a ratio M to FN of four to one. In some localities it is necessary to run with a higher ratio, of the order of five to one or seven to one or even higher, in order to keep out of trouble arising from insufficiently treated sewage. My invention can, however, be applied to any particular plant to determine readily this ratio and enable the optimum ratio for the plant to be determined by the application of the simple principles hereinabove set forth.

The higher the operating ratio M to FN, the better are the results of the treatment, and the more stable is the cycle from being upset or disorganized by a dose of exceptionally strong sewage. But increase of this ratio entails a greater supply of air and consequently greater operating expense. As indicated above, the ratio is normally of the order of between five to one and seven to one, although lower operating ratios are successful in some cases.

The ratio of M to FN can be controlled by adjusting the amount of sludge in the system. In general, a larger amount of sludge in the system gives a larger M and a larger ratio of M to FN. M and the ratio M to FN can readily be reduced by increasing the amount of sludge bled out of the system by the pipe 19. When it is desired to increase M and the ratio M to FN, it is necessary merely to reduce the amount of sludge bled out through pipe 19.

A preferred method of running a plant is to maintain M at a suitable and substantially constant value, which can readily be done in the manner just described, that is, by controlling the amount of sludge bled out through the pipe 19. When operating in this way the ratio of M to FN will fluctuate somewhat, but as long as it does not remain low for a prolonged period no harm results.

Having thus described my invention, what I claim as new and desire to secure by Letters Patent of the United States is:

1. The method of treating sewage which comprises admixing activated sludge therewith, passing the mixed liquid through a series of aerating zones, maintaining a flow from zone to zone in one direction sufficient to present substantial short-circuiting of the liquid in the opposite direction, determining the average oxygen utilization capacity of the liquid in each zone, and individually regulating the air supply to each zone substantially to satisfy said capacity while keeping the dissolved oxygen level low.

2. The method of treating sewage which comprises admixing activated sludge therewith, passing the mixed liquid through an aerating zone, supplying air to the mixed liquid in said zone, determining K the strength of the sewage, determining M the initial oxygen utilization capacity of the mixed liquid, and varying the supply of air along the zone to dissolve oxygen at a rate N established by the equation $$N = \frac{M}{\sqrt{\frac{MT}{K} - 1} + 1}$$

T being time of treatment at any point of the aerating zone and N being variable along the zone.

CARL H. NORDELL.

CERTIFICATE OF CORRECTION.

Patent No. 2,225,437. December 17, 1940.

CARL H. NORDELL.

It is hereby certified that error appears in the printed specification of the above numbered patent requiring correction as follows: Page 4, second column, line 50, claim 1, for the word "present" read --prevent--; and that the said Letters Patent should be read with this correction therein that the same may conform to the record of the case in the Patent Office.

Signed and sealed this 18th day of February, A. D. 1941.

(Seal)

Henry Van Arsdale,
Acting Commissioner of Patents.